Patented Mar. 18, 1952

2,589,910

UNITED STATES PATENT OFFICE 2,589,910

PRODUCTION OF TITANIUM DIOXIDE

Erwin L. Schneider, Palmerton, Pa., assignor to
The New Jersey Zinc Company, New York,
N. Y., a corporation of New Jersey No Drawing. Application March 24, 1949,
Serial No. 83,290

4 Claims. (Cl. 23—202)

This invention relates to the production of titanium dioxide pigment and, more particularly, to the production of such pigment from titaniferous slags obtained by the smelting of iron-titanium ores. The invention resides in a novel method of oxidizing the titanium content of such slags having a valence of less than four whereby the efficient production of a titanium dioxide pigment of high quality may be obtained.

Titanium dioxide pigment can be produced from titanium ores such as ilmenite by digesting the ore with concentrated sulfuric acid, leaching the digested ore with water to obtain a titanium sulfate solution containing from 200 to 250, and preferably about 220 to 230, grams per liter of titanium sulfate, and then precipitating the titanium dioxide from the solution by hydrolysis. In such a process, which is described in the United States patent to Washburn, No. 1,889,027, the titanium ore is mixed with concentrated sulfuric acid in a suitable vessel, and steam is blown into the mass in order to raise its temperature to a value closely approximating that at which the sulfuric acid reacts with the titanium ore. Air may be introduced into the mass along with the steam in order to facilitate agitation. A small amount of water is then introduced into a portion of the heated mass to provide further local heating by dilution of the concentrated acid, and such local heating is sufficient to initiate the reaction between the acid and the ore. The exothermic heat of reaction causes the reaction to spread rapidly throughout the entire mass and results in the generation of sufficient heat to volatilize a large proportion of the water contained in the reaction mass. As described in the patent to Washburn, the introduction of air into the mass may be continued during the reaction period in order to control the reaction temperature, to facilitate mixing of the reactants and to obtain the porosity of the solid reaction product desired to facilitate subsequent leaching. The final reaction product, at the end of the violet reaction period, comprises a hard mass containing generally about 85% of the original titanium content in the form of titanium sulfate. It is conventional practice to follow the foregoing type of digestion procedure with a "baking" treatment wherein the reaction product is allowed to cool slowly over a period of several hours in order to afford an opportunity for more of the titaniferous material to be converted to the sulfate.

The titaniferous slags produced in accordance with the United States patent of Peirce, Waring, and Fetterolf, No. 2,476,453, may be digested with sulfuric acid by the Washburn process. Such titaniferous slags are those obtained by the smelting of titaniferous ores such as ilmenite to remove the major portion of the iron content thereof in the form of pig iron. The slag contains virtually all of the titanium content of the ore, together with a controlled amount of iron oxide as well as slag forming gangue constituents originally present in the ore and possibly some extraneously added lime. Such titaniferous slags, unlike ilmenite ore, yield a digested product which sets in the form of a porous cake without the necessity of introducing air into the reaction mass during the reaction period. When digested in a continuous operation, as in a rotating kiln or the like, the reaction mass is both granular and porous.

Virtually all of the titanium present in ilmenite ore or the like is in the tetravalent state, and consequently all of the titanium sulfate present in the solution obtained by leaching the digested titanium ore is in the tetravalent state in the form of titanic sulfate. It is well established in the art that all of the iron (ferric sulfate) present as a contaminant in the titanium sulfate solution must be maintained in the ferrous state throughout the entire pigment-producing operation in order to minimize adsorption of iron and other miscellaneous oxides on the particles of titanium dioxide produced during hydrolysis. The ferric sulfate can be reduced to ferrous sulfate by the addition of metallic iron or zinc to the leach solution. In order to insure a safe reserve of reduced material which may be preferentially oxidized before the ferrous iron is re-oxidized by any oxidizing condition which may be encountered in the subsequent pigment-producing operation, enough metallic iron or zinc is added to the solution to reduce first all of the ferric iron and then reduce a small amount of the titanic sulfate to titanous sulfate. In general, about 200 pounds of metallic iron or zinc per ton of ore digested is required to reduce all of the ferric iron to the ferrous state and to additionally produce about 1.–1.5 grams per liter of trivalent titanium in the leach solution, the latter being considered to offer the necessary reserve of reduced material to insure good pigment quality.

Titaniferous slags, on the other hand, having been produced under reducing conditions sufficient to recover metallic iron therefrom, may contain up to about 30 per cent of their titanium value in a reduced form having a valence of less than four, such reduced titanium being referred to collectively herein as "trivalent titanium" and the corresponding sulfate as "titanous sulfate." As a result, the leach solution obtained from such sulfuric acid-digested titaniferous slags contains substantially more than one gram per liter of trivalent titanium in the form of titanous sulfate. Inasmuch as titanous sulfate will not yield titanium dioxide by hydrolysis in accordance with the Blumenfeld method or any other hydrolysis procedure now known, that portion of the trivalent titanium in excess of the desired reserve of about 1.–1.5 grams per liter remains in the mother liquor and is lost to the production of titanium dioxide. Accordingly, it is a practical necessity that the excess trivalent titanium be oxidized to the tetravalent state.

Oxidation of the trivalent titanium in the titaniferous slag can be effected prior to digestion by roasting the slag to convert its content of titanous oxide, or other lower oxides, to titanium dioxide. A roasting step of this nature requires additional equipment and handling and is objectionably expensive for these reasons. Oxidation of the trivalent titanium can be effected after digestion by blowing air through the leach solution while agitating it mechanically, but such an oxidizing treatment requires a separate corrosion-resistant aeration tank wherein the leach solution is held for a period of about 3 to 10 hours during aeration, the length of the period depending upon the amount of trivalent titanium (dissolved titanous sulfate) to be oxidized. More rapid oxidation of the dissolved titanous sulfate can be effected by the addition of hydrogen peroxide to the leach solution or by aeration of the leach solution in the presence of activated carbon, but both types of accelerated oxidation are too expensive for practical commercial operation.

I have now found that oxidation of trivalent titanium to the tetravalent state can be effected readily during the baking stage of the digestion operation without requiring additional equipment and without interposing any delay in the flow schedule of conventional operation. Thus, in the sulfuric acid digestion of titaniferous material containing more than about one per cent of its titanium in a reduced state having a valence of less than four wherein the titaniferous material is heated in admixture with concentrated sulfuric acid to initiate reaction therebetween and the reaction mass is permitted to set in the form of a porous mass, I have found that the reduced titanium can be oxidized to the tetravalent state by passing a mixture of an oxygen-containing gas and steam through the porous mass while maintaining the mass at an elevated temperature. In the preferred embodiment of the invention, I maintain the necessary elevated digestion mass temperature by using superheated steam along with the oxygen-containing gas which is passed through the porous mass. Although the method of my invention is equally applicable to the reaction mass whether in the form of a cake resulting from a batch digestion operation or in the form of a granular mass resulting from a continuous digestion operation, the method will be described herein, by way of illustration and explanation, only with regard to treatment of the reaction mass in the form of a porous cake.

The oxidation of the reduced titanium to the tetravalent state which is effected in accordance with my invention by passing an oxygen-containing gas through the porous cake resulting from the digestion reaction cannot be accomplished to any appreciable extent by introducing the oxygen-containing gas into the reaction mass either prior to or during the digestion reaction. The mixture of titaniferous material and sulfuric acid, both before the digestion reaction is initiated and during the reaction itself, is in a fluid condition. In this condition, the particles of solid titaniferous material are completely immersed in a liquid medium, and the introduction of air into such a fluid mass provides little opportunity for contact between the oxygen contained in the gas and the titanium. However, upon completion of the digestion reaction, during which a major portion of the aqueous medium is vaporized and driven out of the reaction mass, the mass sets in the form of a relatively hard but porous cake which makes possible intimate contact between the oxygen and the titanium with resulting oxidation of the reduced titanium on a practicable scale.

Oxidation of trivalent titanium (titanous sulfate) to the tetravalent state by contact with air requires the maintenance of an elevated temperature. The introduction of an oxygen-containing gas into the porous cake resulting from completion of the violent digestion reaction tends to produce by itself a drastic cooling effect. Although the porous cake appears to be a hard dry mass, it nevertheless contains a considerable amount of moisture, and the evaporation of this moisture by the passage of the oxygen-containing gas through the cake quickly absorbs sensible heat from the cake. The magnitude of this chilling effect produced by evaporation is so great that even when the oxygen-containing gas is preheated to a temperature considerably above the temperature of the porous cake at the end of the digestion reaction, the heat removed by evaporation exceeds the sensible heat content of the preheated gas and the net effect remains that of chilling the cake. This evaporation chilling of the porous digestion cake is counteracted, according to the method described and claimed in the co-pending application of John H. Weikel, Serial No. 83,285, filed concurrently herewith, by supplying extraneous heat to the cake in amount sufficient to maintain the temperature of the mass within the range of 150° to 260° C.

I have found, however, that the presence of steam in the porous cake when the oxygen-containing gas is passed therethrough substantially eliminates the chilling effect of such evaporation by maintaining a saturated water vapor atmosphere throughout the interstices of the porous mass and thereby precluding any evaporation of moisture contained in the cake itself. Although the passage of the oxygen-containing gas through the porous cake in the presence of steam causes some cooling of the cake by simple heat exchange, this cooling effect can readily be overcome, for example, either by applying external heat to the cake or by preheating the oxygen-containing gas. However, I have found it to be particularly satisfactory to make up for such heat loss by using superheated steam as the steam supply which prevents excessive cooling due to evaporation of moisture within the cake.

The amount of oxygen-containing gas and steam which is passed through the porous cake in accordance with my invention is not critical and depends primarily upon practical considerations. Thus, the amount of oxygen-containing gas which is required will depend upon the oxygen content of the oxygen-containing gas, the amount of reduced titanium present in the cake, the extent to which it is desired to oxidize this reduced titanium to the tetravalent state, and the period of time which can be devoted to the oxidation treatment. The amount of steam which is used should be sufficient to maintain a substantially saturated water vapor atmosphere within the porous cake during the oxidation treatment, and if superheated steam is used to maintain an elevated temperature during the oxidation treatment, the amount of steam used should be sufficient to provide the desired temperature control.

The oxygen content of the oxygen-containing gas may vary considerably and will depend largely upon the source of the gas. For example, I have found atmospheric air to be particularly satisfactory as the oxidizing medium in accordance with the invention. However, oxygen-enriched air or commercial oxygen alone may be used with advantage, the high oxygen content of such gases making possible the desired oxidation with the use of a smaller volume of gas which, in turn, permits the use of less steam or of lower temperature steam to maintain the desired oxidation temperature within the porous cake. The oxygen-containing gas may comprise the exhaust gas from a wholly unrelated process such as the exhaust gas from an operation in which air is passed in contact with a carbonate-containing material in effecting high temperature calcination thereof. In such case, the sensible heat of the oxygen-containing gas may be availed of in maintaining the oxidizing temperature required in accordance with the present invention. The oxygen-containing gas may also be wholly artificial, such as that resulting from the addition of oxygen to the exhaust combustion gases from a heating operation associated with a metallurgical operation or the like.

The amount of reduced titanium contained in the porous cake depends upon the amount of reduced titanium contained in the titaniferous material which is subjected to the sulfuric acid digestion. In the case of titaniferous slags of the type described in the aforementioned Peirce, Waring, and Fetterolf application, which contain from about 2 to 20% iron oxide (calculated as Fe), the slag will contain reduced titanium in amounts which vary inversely with the iron content of the slag. The relatively low-iron slags are obtained under strong reducing conditions and are accompanied by relatively large amounts of reduced titanium, whereas the high-iron slags are obtained by less drastic reducing conditions and contain a smaller amount of reduced titanium. For example, such slags containing about 18 to 20% Fe, after digestion, will yield leach solutions containing, in addition to about 220–230 grams per liter of titanic sulfate, about 3 to 6 grams per liter of reduced titanium (expressed as trivalent titanium). On the other hand, slags containing about 5 to 10% Fe, after digestion, will yield similar titanic sulfate leach solutions containing about 30 to 35 grams per liter of reduced titanium. Thus, with a uniform rate of introduction of the oxygen-containing gas into porous cakes obtained by digestion of the aforementioned typical slags, a shorter oxidation period will be required for the higher-iron slag than for the lower-iron slag. However, as more fully discussed hereinafter, it is advisable that the oxidation treatment, which is carried out at an elevated temperature, be continued for a sufficient period of time to accomplish baking of the cake in accordance with conventional practice.

As pointed out hereinbefore, it is conventional practice to insure the presence in the leach solution from which the titanium dioxide is precipitated by hydrolysis an amount of trivalent titanium equal to about one gram per liter of $Ti^{+++}$ in order to produce titanium dioxide pigment of high quality. The oxidation treatment in accordance with my invention may be carried out to such an extent as to lower the trivalent titanium content of the digested titaniferous material to that value which corresponds to one gram per liter of trivalent titanium in the leach solution. However, it is not necessary that the oxidation treatment be so accurately controlled. For example, the oxidation treatment may be carried out for a sufficient period of time to insure oxidation of all of the trivalent titanium to the tetravalent state, following which the presence of one gram per liter of reduced titanium in the leach solution may be obtained under carefully controlled conditions by the addition of metallic iron or zinc to the leach solution. On the other hand, the major portion of the trivalent titanium in the digested titaniferous material may be oxidized to the tetravalent state, thus leaving somewhat more reduced titanium in the solid product than that which corresponds to one gram per liter of trivalent titanium in the leach solution. In the latter case, the reduced titanium content of the leach solution can subsequently be lowered to the desired value under carefully controlled conditions by agitating the solution while blowing air therethrough or by the use of other oxidizing agents such as hydrogen peroxide, or the like.

The length of the oxidation treatment for a porous cake obtained from a slag of any specific reduced titanium content will vary inversely with the temperature maintained in the porous cake during the oxidation treatment. In general, I prefer to use superheated steam at a temperature of at least 150° C. in order to maintain approximately the same temperature in the reaction cake during the oxidation treatment. However, I prefer to use superheated steam at temperatures in the range of about 170–200° C. in order to provide corresponding cake temperatures at which the oxidation treatment can be effected more readily, higher temperatures resulting in more rapid oxidation. For example, a porous cake which can have its reduced titanium oxidized to the desired extent in a period of about 2½ hours when the heat supplied to the cake is provided by superheated steam introduced at a temperature of about 170° C. can be oxidized to the same extent in a matter of 30 minutes or less when the heating is provided by the use of stream introduced at a temperature of about 200° C. The foregoing illustration represents typical operation in accordance with the invention in which the porous cake obtained upon digestion of a one-ton mass of slag is oxidized by the introduction thereinto of about 100 pounds of steam per hour and about 10 cubic feet of air per minute. The slag in the foregoing illustration was one which, if simply baked but not oxidized following digestion, would yield a leach solution containing about 35 grams per liter of reduced (trivalent) titanium, and the oxidation treatment was sufficient to yield a leach solution containing about 7 grams per liter of trivalent titanium.

The oxidation of trivalent titanium to the tetravalent state by the method of my invention has a concomitant advantage in that it improves the results accomplished by the baking treatment. The digestion reaction itself generally converts about 80 to 85% of the titanium originally present in the titaniferous material to the form of titanium sulfate. In the course of the conventional baking stage, the self-contained heat of the digestion cake is allowed to dissipate slowly in order to afford the titanium content of the cake the opportunity to become more completely sulfated before the cake temperature falls to a value at which further sulfation ceases. In accordance with the oxidation treatment of my present invention, wherein the porous cake is maintained at an elevated temperature while the oxygen-containing gas and steam are passed therethrough, the maintenance of such an elevated temperature insures more complete conversion of the titanium to the sulfate form.

The improved sulfation of the titanium by the baking conditions provided during the oxidation treatment of my present invention may be illustrated by the following example. A one-ton charge of titaniferous slag produced in accordance with the aforementioned Peirce, Waring, and Fetterolf application, and containing about 8% iron oxide (calculated as Fe), was digested in accordance with the aforementioned Washburn process using concentrated (95%) sulfuric acid. The ratio of the amount of sulfuric acid used (calculated as $H_2SO_4$) to the amount of slag treated was 1.59, and a maximum temperature of 215° C. was attained during the reaction period. After the violent digestion reaction ceased, the porous cake was allowed to cool slowly (i. e. bake) for 3 hours. At the end of the violent digestion reaction about 85% of the titanium originally present in the slag had been converted to titanium sulfate, and by the end of the baking period the extent of titanium sulfation had been increased to 94.6%. The ratio of the volume of the cake to the volume of the reactants, which is a measure of the porosity of the cake, was 1.80. Upon leaching the porous cake with water in amount sufficient to obtain a leach solution containing 213 grams per liter of titanium, the leach solution contained 35.4 grams per liter of reduced titanium expressed as $Ti^{+++}$. The ratio of the amount of titanium solubilized to the amount of sulfuric acid used (calculated as $H_2SO_4$) was 0.416. Another one-ton charge of the same titaniferous slag was then digested under substantially the same conditions as those prevailing in the previously described digestion. The acid-to-slag ratio was 1.60 and the maximum reaction temperature attained was 215° C. About 85% of the titanium content of the slag was converted to the sulfate by the end of the violent digestion reaction. The porous cake, having a ratio of the volume of the cake to the volume of reactants of 1.81, was then treated by blowing air and steam therethrough at the rate of 100 pounds of steam per hour and 10 cubic feet of air per minute. The steam was delivered at about 100 pounds per square inch gauge pressure and at a temperature of about 170° C., and the air, at ambient temperature, was delivered under a pressure of 50 pounds per square inch. The air and steam were passed through the porous cake for a period of 2 hours, and at the end of this period 98.2% of the titanium content of the slag had been converted to the form of the sulfate. When the porous cake was then leached with an amount of water sufficient to yield a solution containing 218 grams per liter of titanium, the resulting solution contained only 7.6 grams per liter of reduced titanium expressed as $Ti^{+++}$. It will be seen, accordingly, that when a titaniferous material containing an appreciable amount of reduced titanium is digested in accordance with conventional sulfuric acid digestion practice, more effective baking can be attained and a substantial reduction in the amount of reduced titanium can be obtained by the oxidation treatment of the present invention.

I claim:

1. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing a mixture of an oxygen-containing gas and steam through the porous cake during the baking stage, the amount of steam present in said mixture being sufficient to maintain a substantially saturated water vapor atmosphere within the porous mass, and maintaining the porous cake during the passage of said gas and steam therethrough at an elevated temperature within the range of 150° to 260° C. to promote oxidation of the reduced titanium to the tetravalent state by the oxygen content of said gas passing therethrough.

2. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and simultaneously passing superheated steam through the porous cake in amount such as to maintain the cake at an elevated temperature within the range of 150° to 260° C. to promote oxidation of the reduced titanium to the tetravalent state by the oxygen content of said gas.

3. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, simultaneously passing steam through the porous cake in amount sufficient to maintain a substantially saturated water vapor atmosphere within the porous mass, and maintaining the cake at an elevated temperature within the range of 150° to 260° C. to promote oxidation of the reduced titanium to the tetravalent state by the oxygen content of said gas.

4. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and simultaneously passing superheated steam at a temperature of about 200° C. through the porous cake in order to maintain the cake at an elevated temperature sufficient to promote oxidation of the reduced titanium to the tetravalent state by the oxygen content of said gas.

ERWIN L. SCHNEIDER.

REFERENCES CITED

The following references are of record in the file of this patent:

UNITED STATES PATENTS

| Number | Name | Date |
| --- | --- | --- |
| 1,389,191 | Goldschmidt | Aug. 30, 1921 |
| 1,889,027 | Washburn | Nov. 29, 1932 |
| 2,069,554 | Monk et al. | Feb. 2, 1937 |
| 2,125,340 | Hager | Aug. 2, 1938 |
| 2,149,370 | Smith | Mar. 7, 1939 |
| 2,192,501 | McKinney | Mar. 5, 1940 |
| 2,290,111 | Merriam et al. | July 14, 1942 |
| 2,292,507 | Brooks | Aug. 11, 1942 |
| 2,476,453 | Peirce et al. | July 19, 1949 |

FOREIGN PATENTS

| Number | Country | Date |
| --- | --- | --- |
| 22,895 | Norway | Jan. 6, 1913 |